July 11, 1961

D. P. WELLES, JR 2,991,491

FLUTELESS SWAGING TAP WITH SIZING AREA
INCREASING AT A CONSTANT RATE

Filed Nov. 21, 1958

INVENTOR.
Donald P. Welles Jr.,
BY Parker & Carter
Attorneys.

United States Patent Office 2,991,491
Patented July 11, 1961

2,991,491
FLUTELESS SWAGING TAP WITH SIZING AREA INCREASING AT A CONSTANT RATE
Donald P. Welles, Jr., Rockford, Ill., assignor to Besly-Welles Corporation, South Beloit, Ill., a corporation of Illinois
Filed Nov. 21, 1958, Ser. No. 775,505
3 Claims. (Cl. 10—152)

This invention is in the field of taps or tapping equipment or thread forming devices and is concerned with a new and improved fluteless tap constructed to give long tap life and requiring low torque.

A primary object of the invention is a new and improved tap which gives accurate threads with a long tap life.

Another object is a fluteless tap which swages and does not cut or produce chips when threading a hole or bore.

Another object is a fluteless tap with a plurality of circumferentially spaced thread forming or sizing areas having trapezoidal side flanks.

Another object is a fluteless tap of the above type in which radial reliefs are disposed between adjacent thread forming or sizing areas.

Another object is a fluteless tap which is simple and inexpensive to make.

Another object is a fluteless tap with convex radial reliefs.

Another object is a method of making a tap which insures full root depth.

Other objects will appear from time to time in the ensuing specification and drawings in which.

Figure 1:
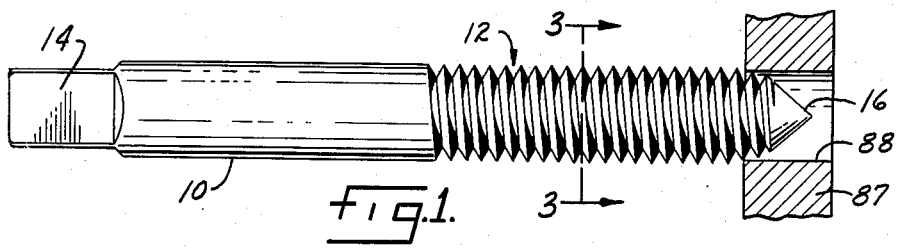
FIGURE 1 is a side view of a tap of this type being introduced into a bore for threading it.

In FIGURE 1, a tap is shown which may include a shank 10 with a thread or working area 12 toward the forward end and a conventional square or milled end 14 at the other. The threaded section 12 may be either right or left hand and a point 16 may be provided at the tip end, if desired, or it might be blunted.

The threads are formed or constructed generally according to prior Patent 2,807,813, issued October 1, 1957. Radial reliefs at spaced circumferential intervals are provided to reduce torque. The high points or sizing areas are suitably spaced circumferentially about the thread with the reliefs interposed or spaced therebetween.

Figure 2:
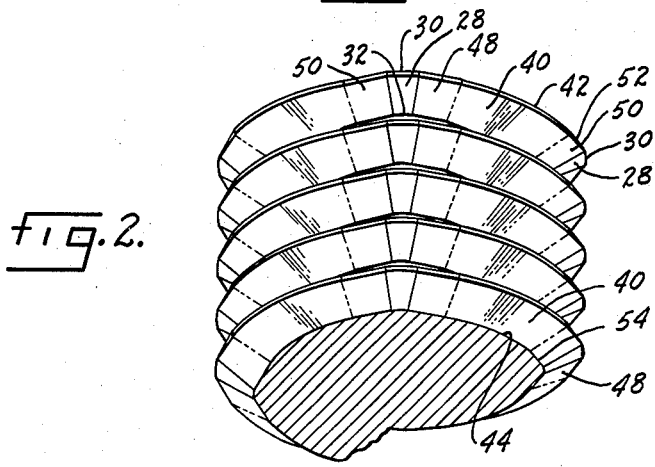
FIGURE 2 is a perspective, on an enlarged scale, of a portion of the thread on this tap.
Figure 3:
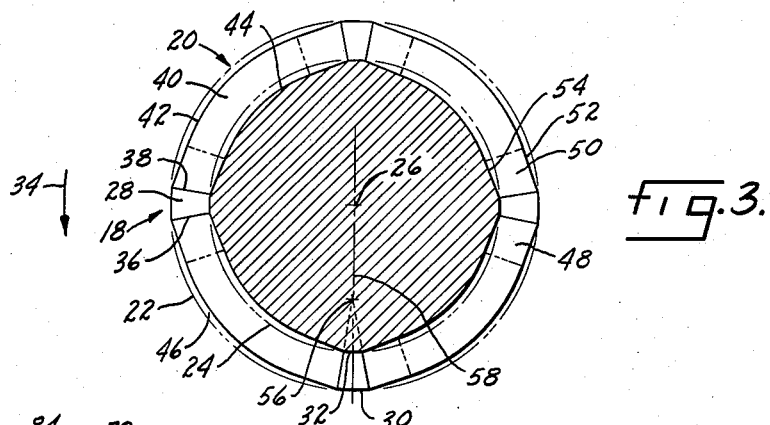
FIGURE 3 is a lateral section generally along line 3—3 of FIGURE 1, on an enlarged scale, through the root of thread showing the thread outline but without lead.

As shown in FIGURES 2 and 3, the high points or sizing areas, designated generally 18, may be disposed every 90 degrees around the tap or thread, dividing it into quadrants, with radial reliefs, designated generally 20, in between. Or the sizing areas might be 120 degrees apart with three in each thread turn, or any suitable number might be used. The sizing areas may be considered to be defined by normal or maximum crest and root circles 22 and 24 which are concentric with the tap axis 26. It will be noted in FIGURE 3 that if the crest and root circles 22 and 24 are extended, the radial reliefs 20 are set back or offset radially inwardly somewhat. The thread depth may be considered to be the radial distance between the crest and root circles 22 and 24, and this same thread depth is maintained in the radial reliefs. This is to say that the crest and root lines in the radial reliefs are spaced the same radial distance apart as they are in the sizing areas.

The sizing areas 18 have flank areas or side flanks which are generally trapezoidal shaped and hereinafter the sizing areas may be considered to have trapezoidal flanks, designated generally 28. In detail, this trapezoidal flank on each side of the thread has an outer or crest arc 30 which is defined by and may be considered a part of the crest circle 22. A corresponding inner or root arc 32, of less peripheral extent, may be considered to be defined by and, in effect, is a part of the root circle 24. For purposes of illustration, assume that the tap turns in the direction of the arrow 34 during threading. The trapezoidal flank 28 will then have a leading side 36 and a trailing side 38, but the leading and trailing designations could be considered reversed, depending upon the direction of rotation of the tap.

The leading and trailing sides 36 and 38 are straight. However, the two other sides are defined by the crest and root arcs 30 and 32 which are not straight. Accordingly, the flank configuration may not conform to the precise geometrical definition of a trapezoid, but for purposes of illustration, the term trapezoid or trapezoidal shall be used to designate or refer to this flank area.

Each of the radial reliefs 20 between adjacent trapezoidal flanks may be formed or constructed in one of a number of ways. In the particular form shown in FIGURE 3, which is the preferred form, the radial relief is divided into three distinct areas. For example, a central relief area 40 is provided which has crest and root arcs 42 and 44, respectively, concentric with the tap axis 26 and swung on a constant radius about that axis. It will be noted that the crest arc 42 is set below or inwardly from the normal or maximum crest circle 22 by a suitable distance designated 46. The distance 46, in effect, represents the amount or magnitude of the radial relief. It should be understood that the radial distance between the crest and root arcs 42 and 44 is the same as the thread depth, which is the radial distance between crest and root circles 22 and 24. Accordingly, the thread depth throughout the central radial relief area 40 is constant and is the same as the thread depth established at the sizing areas 18.

On each side of the central relief area 40, a tangent, sliding or working area is provided which leads into the sizing areas on each side. Since the direction of rotation is considered to be according to arrow 34, the tangent or sliding area 48 may be designated as the trailing tangent area and the other 50 as the leading tangent area. The leading and trailing sliding areas may be considered to be the same or identical except symmetrically opposite and, accordingly, the explanation applied to one fits the other.

Considering the trailing sliding area 48, it may be formed by crest and root lines 52 and 54 which are tangent to the crest and root arcs 42 and 44 of the center relief area. These lines join the trapezoidal flank 28 at the corners thereof. The same is true of the leading sliding area 50, except reversed.

The amount of relief 46 determines the slope or inclination of the crest and root lines 52 and 54 of the sliding areas, since these lines intersect the corners of the trapezoidal flank and should also be tangent to the crest and root arcs 42 and 44 of the central relief area 40.

It is also important that the leading and trailing sides 36 and 38 of the trapezoidal flank be inwardly convergent and, if extended, as shown in broken lines in FIGURE 3, should intersect at a point 56 which is between the inner or root arc 32 and the tap axis 26. A radial line 58 has been shown in FIGURE 3 which bisects the crest arc 30 and, in this case, also bisects the root arc 32. But be that as it may, the radial bisecting line 58 should be intersected by both the leading and trailing sides of the trapezoid, when extended, at some point between the inner arc 32 or root circle 24 and the tap axis 26. As shown in FIGURE 3, the trapezoidal flank is symmetrical about the radial bisecting line 58 and, accordingly, the leading and trailing sides intersect at the same point, namely 56. But this is not necessary and the leading and trailing sides might be differently inclined to the radial line 58 and would intersect it at different points between the root circle 24 and the tap axis. But be that as it may, whether they intersect at the same point or different points, both should intersect the radial bisecting line between the root circle 24 and the tap axis 26.

The radial relief configuration between the trapezoidal flanks may be varied somewhat. For example, in FIGURE 4, a modified form or variant has been shown in which trapezoidal flanks 60 and 62, spaced 90 degrees apart, may and should be the same as the trapezoidal flanks set forth in detail in FIGURE 3. But the radial relief area in between is formed by swinging uniform arcs, for both the crest and root lines, about radii greater than the radii of the normal crest and root circles which define the trapezoidal flank. For example, the crest and root circles 64 and 66 in FIGURE 4, which define the inner and outer boundaries of the trapezoidal flanks, may be considered to be swung on radii 68 and 70 about the tap axis 72, the difference between radii 68 and 70 being the thread depth. The relief area has crest and root areas 74 and 76, respectively, which are swung on radii 78 and 80 about an imaginary center 82 offset from the tap axis 72, in this case at 45 degrees, by a distance designated 84. The amount of actual radial relief in the middle of the radial relief area, in this case designated 86, may be the same as the radial relief 46 in FIGURE 3. But the crest and root arcs 74 and 76 of the relief area uniformly increase on each side of the center point 86 and intersect the normal crest and root circles at the corners of the trapezoidal flanks 60 and 62.

The point is that the precise configuration of the radial relief between adjacent trapezoidal flanks is not critical and may be varied somewhat.

The use, operation and function of the invention are as follows:

The tap does not have flutes. This is to say that the thread on the tap is continuous and uninterrupted, although it does have an undulating contour and, if laid out on a straight line, would have or would define a sinusoidal curve, or something similar. But throughout its undulating or changing contour, the thread depth is maintained constant and all working and sizing areas are convex so that no chips will result in use.

The thread formation will have high points or sizing areas uniformly spaced about the thread with low points or radial reliefs between them. The high points will determine the resulting thread formation in a bore or hole and the radial reliefs will reduce the torque, provide for the flow of coolant or lubricant, and prevent chip formation which means metal flow instead of cutting.

In use, a tap of this type should have a prebored hole, such as shown in FIGURE 1. The part 87 to be threaded has a bore with an initial or bored diameter 88 generally the same as the diameter of the pitch circle for the sizing areas 18 or trapezoidal flanks. This is to say that the hole 88 should be prebored to a diameter which corresponds approximately to the pitch diameter of the high points or sizing areas on the tap. In practice, the diameter of the prebored hole should be slightly greater than this pitch diameter so that slightly less material will be forced inwardly by the crests of the threads into the root as there is room in the root to receive it. This results in a smooth material working or metal flow operation without cutting.

It is also important that the trapezoidal flanks have a crest arc 30 of substantial peripheral extent. There should also be a root arc 32 of significant peripheral extent since both the crest and root arcs are highly important in forming threads accurately. But at the same time, the total peripheral extent of all the trapezoidal areas should be held down, otherwise excessive torque will be required to turn the tap. Another consideration is that the peripheral extent of the crest and root arcs for each trapezoidal flank should be sufficient for adequate tap life.

The advantage of the particular radial relief structure set forth in FIGURE 3 is that the work of metal forming or displacing will be carried out by the leading tangent area 50 which merges with the trapezoidal flank at a small angle. Thus, a blunt shoulder is not present and a smooth metal flowing operation will take place. At the same time, the trailing tangent areas 48 drops away from the crest and root circles 22 and 24 of the trapezoidal flank at a small but decided angle so that excess drag causing high torque is avoided.

The trapezoidal flank should have its sides convergent and they should intersect each other at a point between the root circle 24 and the tap axis 26, either on the radial bisecting line 58 or beside it, depending upon the particular inclination of the leading and trailing sides. If these lines are formed so that they do not intersect in this area, the thread formation between the trapezoidal flanks of adjacent thread turns will not form an accurate thread, and the tap will have insufficient life.

In the form shown, the trapezoidal flanks from one turn of the thread to the next are axially aligned, but they could be helically disposed or otherwise. In this sense, the axial alignment is not critical.

Figure 4:
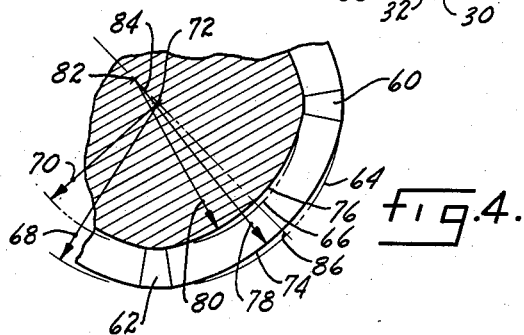
FIGURE 4 is a section, similar to FIGURE 3, of a modified form, only showing one quadrant.

The leading and trailing sides 36 and 38 have been referred to as straight, and so they will appear in a lateral section when viewed axially, such as in FIGURES 3 and 4. However, depending upon the particular basic thread formation used, they might in reality be curvilinear. For example, such as in the standard Whitworth thread or otherwise.

The modified form in FIGURE 4 has been shown in which the radial reliefs are swung on a uniform arc having greater radii than the tap itself, but other variations might be used for the radial reliefs. For example, the radial relief might have elliptical crests and roots.

In FIGURE 1, the point should be tapered and the full thread depth should be maintained throughout, which is to say that three or four turns toward the pointed end 16 should be drawn inwardly with the crest, pitch and root circles uniformly decreasing, but maintaining a constant thread depth and lead. The radial reliefs should also be carried out on the point, as set forth in prior Patent 2,807,813, issued October 1, 1957.

Whereas the preferred form and one modification of the invention has been shown and described and others have been suggested, it should be understood that suitable additional modifications, changes, substitutions, and alterations may be made without departing from the invention's fundamental theme. While the terms used, such as trapezoidal, convex, etc. in many cases may not be geometrically accurate, nevertheless, where used in the ensuing claims, they are intended to define and cover the invention disclosed hereinabove. With these and other points and modifications in mind, it is wished that the invention be unrestricted, except as by the appended claims.

I claim:

1. A fluteless tap comprising a shank and a main thread forming portion, a thread form thereon having a plurality of equally spaced elevated sizing areas with trapezoidal shaped flanks separated by an equal number of radial reliefs offset radially inwardly from the sizing areas, the crest and root of the trapezoidal flanks of the sizing areas being in the form of arcs defined by concentric maximum crest and root circles, the arcs of the crest and root circles at each trapezoidal flank being of a perceptible peripheral extent, the sides of each of the trapezoidal flanks being defined by observable lines which are rectilinear and convergent inwardly generally toward the axis of the tap, the lines for each such trapezoidal flank, when extended, intersecting each other at a point between the axis of the tap and the maximum root circle, each sizing area being bounded helically on each side thereof by symmetrically opposite leading and trailing sliding areas, each such sliding area being of limited peripheral extent and having a crest and root which approach the maximum crest and root circles of the trapezoidal flanks at a constant rate.

2. The structure of claim 1 in which each of the radial reliefs constitutes an uninterrupted continuation of the sliding areas on each side thereof, thereby defining a helically uninterrupted thread form.

3. The structure of claim 1 further characterized in that each of the radial reliefs is defined by lesser crest and root circles concentric with the tap axis, the crest and root of the sliding areas on each side thereof joining the crest and root circles of the radial reliefs tangentially thereto to form a helically uninterrupted thread form.

References Cited in the file of this patent

UNITED STATES PATENTS

| | | |
|---|---|---|
| Re. 24,572 | Welles | Dec. 2, 1958 |
| 2,352,982 | Tomalis | July 4, 1944 |
| 2,703,419 | Barth | Mar. 8, 1955 |
| 2,807,813 | Welles | Oct. 1, 1957 |